(12) United States Patent
Fuld

(10) Patent No.: US 7,007,193 B1
(45) Date of Patent: Feb. 28, 2006

(54) METHOD AND SYSTEM FOR RECONSTRUCTING DATA SERIALLY ARRANGED ON A MAGNETIC TAPE TRACK

(75) Inventor: Stephen Fuld, Thousand Oaks, CA (US)

(73) Assignee: Storage Technology Corporation, Louisville, CO (US)

( * ) Notice: Subject to any disclaimer, the term of this patent is extended or adjusted under 35 U.S.C. 154(b) by 787 days.

(21) Appl. No.: 09/479,146

(22) Filed: Jan. 7, 2000

(51) Int. Cl.
*G06F 11/00* (2006.01)

(52) U.S. Cl. ............................................. 714/6; 714/7
(58) Field of Classification Search .................... 714/6, 714/7, 770
See application file for complete search history.

(56) References Cited

U.S. PATENT DOCUMENTS

| | | | |
|---|---|---|---|
| 3,558,811 A * | 1/1971 | Montevecchio et al. .... | 358/410 |
| 3,633,162 A * | 1/1972 | Findeisen .................... | 714/48 |
| 5,469,566 A | 11/1995 | Hohenstein et al. | |
| 5,502,811 A | 3/1996 | Ripberger | |
| 5,537,534 A | 7/1996 | Voigt et al. | |
| 5,592,497 A * | 1/1997 | Lokhoff ....................... | 714/755 |
| 5,758,057 A * | 5/1998 | Baba et al. .................... | 714/7 |
| 5,787,460 A | 7/1998 | Yashiro et al. | |
| 5,805,788 A | 9/1998 | Johnson | |
| 5,812,753 A | 9/1998 | Chiariotti | |
| 5,859,965 A | 1/1999 | Gittins et al. | |
| 6,018,778 A * | 1/2000 | Stolowitz ....................... | 714/6 |
| 6,023,780 A * | 2/2000 | Iwatani ....................... | 714/770 |
| 6,055,646 A * | 4/2000 | Uchihori et al. ................ | 714/6 |
| 6,237,052 B1 * | 5/2001 | Stolowitz .................... | 714/770 |
| 6,532,548 B1 * | 3/2003 | Hughes .......................... | 714/6 |

OTHER PUBLICATIONS

"Single and Adjacent Double Errror Correction System," IBM Technical Disclosure Bulletin, Jun. 1961.*
"Error Detection and Correction," IBM Technical Disclosure Bulletin, May 1971.*
White, Ron, How Computers Work, Sep. 1999, Que Corporation, Millennium Edition, pp. 176-177.*

* cited by examiner

*Primary Examiner*—Robert Beausoliel
*Assistant Examiner*—Michael C. Maskulinski
(74) *Attorney, Agent, or Firm*—Brooks Kushman P.C.

(57) ABSTRACT

A RAID or RAIT type data storage array such as a single tape RAIT includes storage elements storing data blocks and a parity block based on the data blocks. The array reads the data blocks sequentially from respective storage devices. The array determines if any of the data blocks are bad as the data blocks are being read. The array accumulates the parity of good data blocks as the data blocks are being read. A bad data block is reconstructed from the accumulated parity of the good data blocks and the parity block.

6 Claims, 3 Drawing Sheets

METHOD AND SYSTEM FOR RECONSTRUCTING DATA SERIALLY ARRANGED ON A MAGNETIC TAPE TRACK

TECHNICAL FIELD

The present invention relates generally to redundant array of inexpensive disks (RAID) methods and systems and, more particularly, to a data storage array method and system which accumulate a running parity of data blocks as the data blocks are read sequentially from respective storage elements such that the data blocks prior to a bad data block do not have to be reread for obtaining the parity information needed to complete the reconstruction of the bad data block.

BACKGROUND ART

A data storage array is a collection of storage elements that are accessible by a host computer as a single storage unit. The individual storage elements can be any type, or a combination of types, of storage devices such as, hard disk drives, semiconductor memory, optical disks, magnetic tape drives, and the like. The individual storage elements may also be a track in a single magnetic tape.

A data storage array includes a collection of storage elements and a controller. The controller controls the operation of the storage elements and presents them as a single storage unit to a host computer. The host computer typically executes an operating system and application programs. A virtual storage element is an abstract entity realized by the controller and the data storage elements. A virtual storage element is functionally identical to a single physical storage element from the standpoint of the host computer.

One such data storage arrays is a redundant array of independent disks (RAID) or tapes (RAIT). RAID comes in various operating levels which range from RAID level 0 (RAID-0) to RAID level 6 (RAID-6). Additionally, there are multiple combinations of the various RAID levels that form hybrid RAID levels such as RAID-5+, RAID-6+, RAID-10, RAID-53 and so on. Each RAID level represents a different form of data management and data storage within the RAID disk array.

In a RAID-4 array, data is generally mapped to the various physical storage elements in data "stripes" across the storage elements and vertically in a "block" within a single storage element. To facilitate data storage, a serial data stream is partitioned into data blocks. Each data block is stored on a different storage element as the data blocks are striped across the storage elements. Once all the storage elements in a data stripe have been given data blocks, the storage process returns to the first storage element in the data stripe, and stripes data blocks across all the storage elements again.

In a RAID-4 array, data consistency and redundancy is assured using parity data that is striped to one of the storage elements. Specifically, a RAID-4 array contains N−1 data storage elements and a parity storage element. Each data stripe contains N−1 data blocks and one parity block. N−1 data blocks are striped to respective N−1 data storage elements and a parity block is striped to the parity storage element. The process then continues for the next data stripe.

RAID-4 parity is generated using an exclusive OR (XOR) function. In general, parity data is generated by taking an XOR function of the data blocks within a given data stripe. Using the parity information, the contents of any block on any single one of the storage elements in the array can be regenerated from the contents of the corresponding blocks on the remaining storage elements in the array. Consequently, if the XOR of all corresponding blocks in the data stripe, except one is computed, the result is the remaining block. Thus, if data storage element one in the storage element array should fail, for example, the data block it contains can still be delivered to applications by reading corresponding blocks (data and parity) from all the surviving storage elements and computing the XOR of their contents. As such, the RAID-4 array is said to be fault tolerant, i.e., the loss of one storage element in the array does not impact data availability.

In a data storage array, the controller accumulates parity as the data blocks are sequentially written from the host computer to the storage elements. When all of the data blocks in a data stripe have been written to respective data storage elements, the controller writes the parity block to the parity storage element. The controller then reinitializes and starts accumulating parity again for the next data stripe to be written to the storage elements. This continues until all of the data blocks have been written to the storage elements.

During normal reading operation, the controller sequentially passes the data blocks to the host computer from the storage elements and discards the parity blocks. If a read error occurs such that a data block is unreadable, the controller returns to the storage element having the first data block in the data stripe and then sequentially rereads the data blocks prior to the bad data block. The controller accumulates parity for the reread data blocks. The controller then skips the bad data block and continues sequentially reading the remaining data blocks and the parity block in the data stripe. The controller then reconstructs the bad data block from three factors. These factors are the parity of the data blocks prior to the bad data block, the data blocks after the bad data block, and the parity block.

A problem with rereading the data blocks prior to the bad data block for reconstructing the bad data block is that this operation is time consuming. What is needed is a data storage array method and system for accumulating the parity of data blocks during sequential reading. Thus, it would not be necessary to reread the data blocks prior to a bad data block as the controller would already have the information (parity of the data blocks already read) needed to complete the reconstruction of the bad data block.

SUMMARY OF THE INVENTION

Accordingly, it is an object of the present invention to provide a data storage array method and system which accumulate parity of blocks as the blocks are sequentially read from respective storage elements such that the blocks prior to a bad data block do not have to be reread for obtaining the parity information needed to complete the reconstruction of the bad data block.

It is another object of the present invention to provide a data storage array method and system in which a controller accumulates a running parity of blocks as the blocks are sequentially read from magnetic tape to obtain the parity information needed to complete the reconstruction of a bad data block.

It is a further object of the present invention to provide a data storage array method and system which accumulate parity of data blocks as the data blocks are sequentially read from respective storage elements such that the data blocks prior to a bad data block do not have to be reread for obtaining the parity information needed to complete the reconstruction of the bad data block.

In carrying out the above objects and other objects, the present invention provides a method for reading data blocks in a data storage array having data storage elements and a parity storage element. Each of the data storage elements store a respective data block and the parity storage element stores a parity block. The parity block is based on the data blocks. The method includes reading blocks sequentially from respective storage elements. Any bad data blocks are determined as the data blocks are being read. Parity of the good data blocks is then accumulated as the data blocks are being read. The parity block is then read from the parity storage element. A bad data block is then reconstructed from the accumulated parity of the data blocks and the parity block.

In carrying out the above objects and other objects, the present invention provides another method for reading data blocks. This method includes reading data blocks sequentially from respective data storage elements. Any bad data blocks are determined as the data blocks are being read. Parity of the good data blocks is then accumulated as the data blocks are being read. The parity block is then read from the parity storage element. A bad data block is then reconstructed from the accumulated parity of the good data blocks and the parity block.

Preferably, accumulating parity of the data blocks includes exclusive ORing the parity of the good data blocks read prior to the current good data block being read with the current good data block being read. Reconstructing a bad data block includes exclusive ORing the parity of the good data blocks with the parity block. The method preferably further includes storing the good data blocks read after the bad data block until the bad data block is reconstructed to preserve ordering of the data blocks during reading.

In carrying out the above objects and other objects, the present invention further provides a data storage array for reading data blocks. The system includes data storage elements each storing a respective data block and a parity storage element storing a parity block based on the data blocks. A controller sequentially reads data blocks and the parity block from respective storage elements. The controller determines if any of the data blocks are bad as the data blocks are being read. A parity accumulator accumulates parity of the good data blocks as the controller reads the data blocks until the controller determines one of the data blocks to be bad. The controller reconstructs a bad data block from the accumulated parity of the good data blocks and the parity block. The storage elements are preferably either magnetic tape drives, magnetic disk drives, or a single track of a magnetic tape.

The advantages accruing to the present invention are numerous. For instance, the present invention allows higher speed operation in the event of read errors. Additional buffer bandwidth is not required as determining the accumulated or partial parity of the blocks is the same information that is performed during writing.

The above objects and other objects, features, and advantages of the present invention are readily apparent from the following detailed description of the best mode for carrying out the present invention when taken in connection with the accompanying drawings.

BEST MODES FOR CARRYING OUT THE INVENTION

Figure 1:
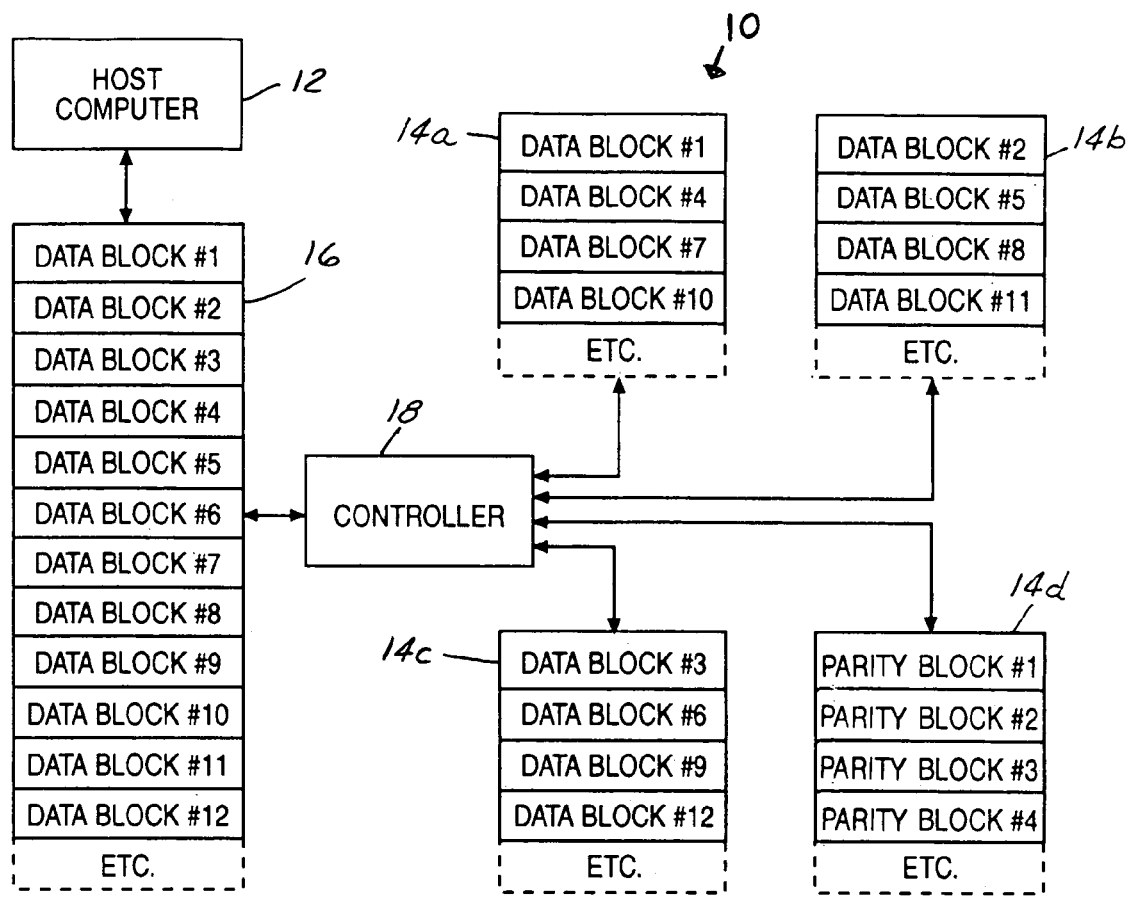
FIG. 1 illustrates a block diagram of a conventional data storage array system.

Referring now to FIG. 1, a data storage array system 10 containing a host computer 12 and a plurality of individual storage elements 14a, 14b, 14c, and 14d is shown. Host computer 12 executes, on one or more processors, an operating system as well as various applications that periodically read and write information from and to the storage elements. For simplicity, the combination of the operating system and applications shall be referred to as the operating environment. The operating environment accesses various ones of the storage elements as if the individual storage elements functioned as a single, large storage element.

Typically, the storage elements are inexpensive hard disk drives arranged in an array. Various other forms of data storage elements may be substituted for, or combined with, the disks. Such other forms of storage elements include, but are not limited to, optical drives, ZIP drives, floppy disk drives, semiconductor memory devices, magnetic tape drives, or any other form of random access memory. Although any of these other forms of storage elements may be used with the present invention, the following discussion refers to a single track of a single magnetic tape, i.e., single tape RAIT.

When using a single magnetic tape, the operating environment treats the single track 14 of the magnetic tape (shown in FIG. 3) commonly referred to as a virtual tape 16. The data blocks are represented to host computer 12 as being stored in virtual tape 16 in serial fashion. Thus, the operating environment requests data from virtual tape 16 using a convenient single address. A controller 18 ensures that the address into virtual tape 16 is mapped to an address within the single track of the magnetic tape. Controller 18 can also reside within host computer 12.

In a redundant array of independent storage devices, such as disks or tapes, the physical storage units 14a, 14b, 14c, and 14d, known as members, are accessed via controller 18. Data blocks are distributed, or striped, serially amongst members 14a, 14b, 14c, and 14d. To achieve fault tolerance, the data blocks are arranged into redundancy groups where the data blocks within a data stripe are self consistent with the other data blocks in the data stripe. One technique for making the data stripe redundant is to use a parity block based on the data blocks. As such, the redundancy information is a parity block in which the data blocks in the data stripe are XOR (exclusive OR) consistent.

Figure 2:
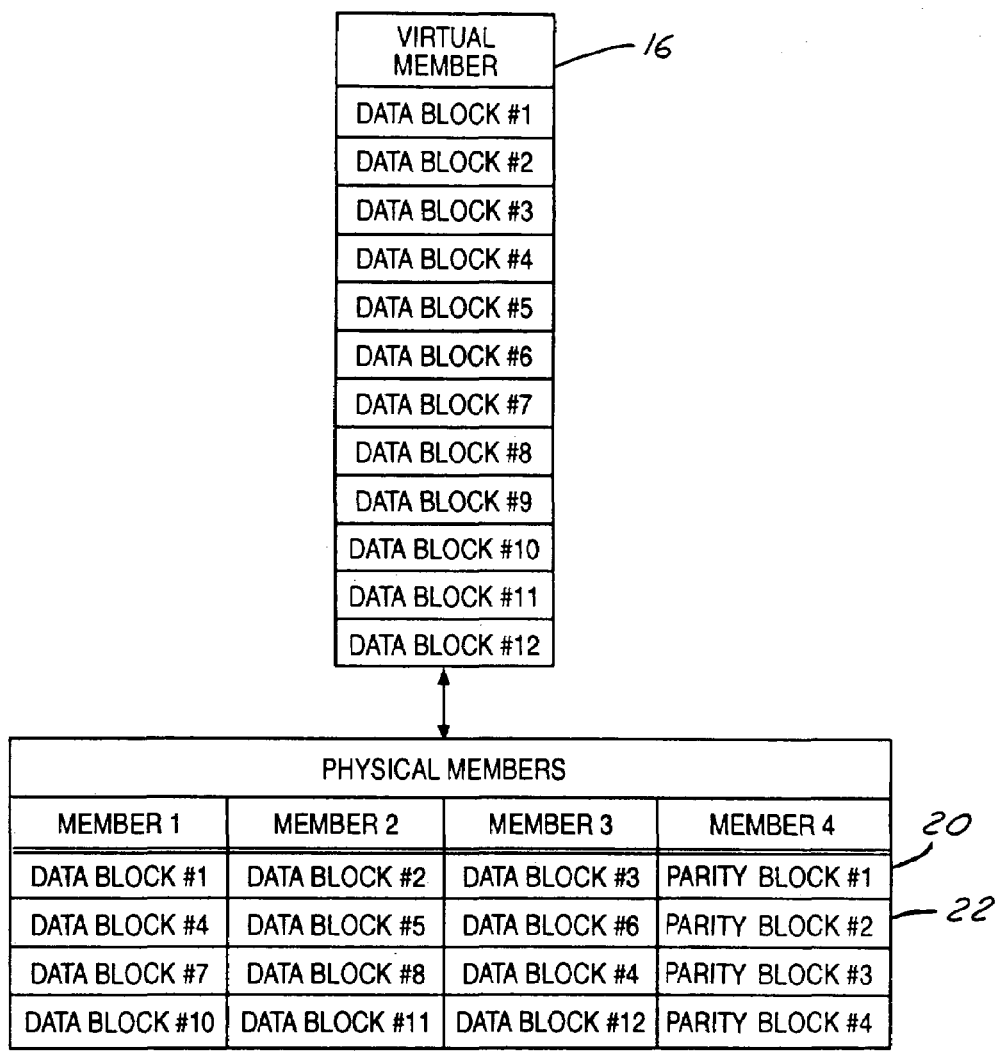
FIG. 2 illustrates a conventional data striping format for a RAID-4 storage element array.

FIG. 2 depicts a conventional data striping format for a RAID-4 storage element array. Under the RAID-4 standard, data blocks appearing in virtual track 16 are striped across the members 1–3. A parity block based on the data blocks is striped to member 4. Under RAID-4, the parity block is stored in a dedicated parity storage member. However, the parity block may be stored in a diagonal manner across the members as done under RAID-5. The pattern of storage is not important as long as the parity block locations are mappable. Consequently, controller 18 knows where the parity blocks are stored such that the parity blocks can be easily identified.

Use of parity blocks to form consistent data stripes is well-known in the art and a description regarding the use of parity information in a RAIT-4 storage array system will clarify operation of the present invention. Parity blocks are generated by using an exclusive OR (XOR) function upon a series of data blocks located within a given data stripe 20. For example, in FIG. 2, parity block #1 is formed by applying the XOR function to data block #1 through data block #3 (e.g., data block #1 ⊕ data block #2 ⊕ data block #3=parity block #1). Similarly, in data stripe 22, data block #4 ⊕ data block #5 ⊕ data block #6=parity block #2 and so on. Thus, each data stripe is XOR consistent.

If one of the members ceased to function, the information contained in the remaining members is used to reconstruct the data block on the damaged member. For example, if member 2 were damaged, data block #2 in data stripe 20 would be unreadable. However, data block #2=data block #1 ⊕ data block #3 ⊕ parity block #1. Thus, the array is fault tolerant, i.e., if one member is damaged at a given time the system is still operational without any loss of data.

Figure 3:
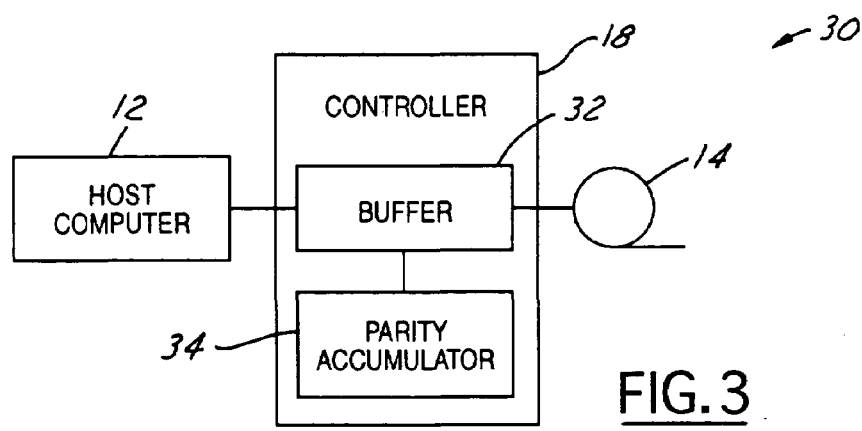
FIG. 3 illustrates a data storage array system in accordance with the present invention.
Figure 4:
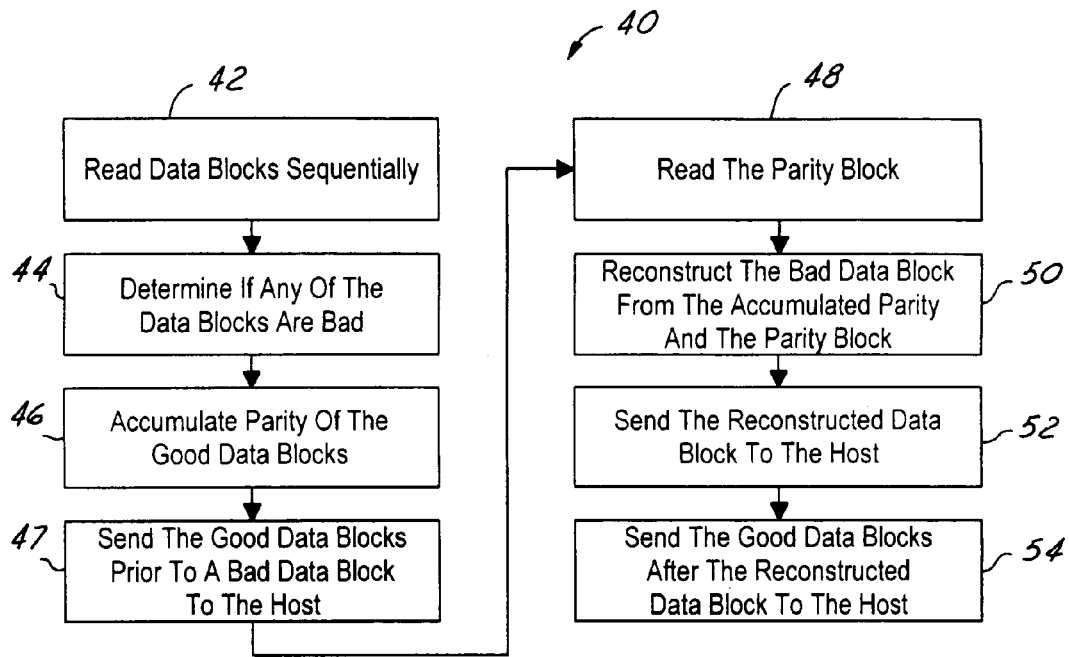
FIG. 4 illustrates a flow chart showing operation of the method and system of the present invention.

Referring now to FIGS. 3–4, with continual reference to FIGS. 1–2, the data storage array method and system of the present invention will be described. Data storage array system 30 includes a host computer 12, a single magnetic tape storage element 14, and a controller 18. Controller 18 is operable to serially write data blocks and parity blocks from host computer 12 onto a track of magnetic tape 14. Controller 18 is also operable to sequentially read data blocks and parity blocks from a track of magnetic tape 14 for host computer 12.

Controller 18 includes a buffer 32 and a parity accumulator 34. Parity accumulator 34 accumulates parity as controller 18 sequentially writes the data blocks from host computer 12 to magnetic tape 14 via buffer 32. After =controller 18 sequentially writes all of the data blocks in a data stripe to magnetic tape 14, the controller writes the parity block from parity accumulator 34 to the magnetic tape. Parity accumulator then reinitializes and starts accumulating parity again for the next data stripe to be written to magnetic tape 14. This continues until controller 18 has written all of the data blocks to the single track of magnetic tape 14.

During reading, controller 18 serially passes the data blocks to host computer 12 from magnetic tape 14 via buffer 32. Controller 18 discards the parity block belonging to a data stripe after sequentially passing all of the data blocks in the data stripe to host computer 12. Controller 18 sequentially reads the data blocks and determines if any one of the data blocks are bad before passing the data blocks to host computer 12. If the data block is good, controller 18 passes the good data block to host computer 12. If the data block is bad, controller 18 reconstructs the bad data block to make it a good data block before passing it and any other good data blocks to host computer 12.

The procedure for reconstructing a bad data block into a good data block in accordance with the present invention will now be explained in greater detail. While controller 18 reads a data block, parity accumulator 34 accumulates the parity of the data blocks up to and including the current data block being read. For instance, if controller 18 has read data block #1 and is now reading data block #2, parity accumulator 34 accumulates the parity of data blocks #1 and #2 (e.g., accumulated parity=data block #1 ⊕ data block #2). Similarly, if controller 18 is reading data block #4, the first data block in data stipe 22, and has not read any other data blocks in data stripe 22, then parity accumulator 34 accumulates the parity of data block #4 (e.g., accumulated parity=data block #4). The accumulated parity is the partial parity of all of the blocks in a data stripe, i.e., the parity of the blocks in a data stripe that have been read.

When controller 18 determines that a data block is unreadable or bad, the controller skips the bad data block and continues sequentially reading the remaining data blocks and the parity block in the data stripe. Controller 18 then reconstructs the bad data block from two factors. The first factor is the accumulated parity of the good data blocks of the data stripe read by controller 18. Parity accumulator 34 accumulates and maintains the accumulated parity of the good data blocks as the data blocks are being read. The second factor is the parity block of the data stripe.

For instance, if a data stripe being read has six data blocks and one parity block and if data block #3 is bad, then controller 18 reconstructs data block #3 in accordance with the following equation: data block #3=accumulated parity ⊕ parity block #1, where accumulated parity=data block #1 ⊕ data block #2 ⊕ data block #4 ⊕ data block #5 ⊕ data block #6.

Buffer 32 stores the good data blocks read by controller 18 after the bad data block. After controller 18 reconstructs the bad data block and passes it to host computer 12, the controller directs buffer 32 to pass the stored good data blocks to host computer 12 in the order that they were read by the controller. This preserves data block ordering.

Referring now to FIG. 4, with continual reference to FIGS. 1–3, a flow chart 40 illustrating operation of the data storage array method and system of the present invention are shown. Flow chart 40 initially begins with controller 18 reading the data blocks sequentially from magnetic tape 14 as shown in box 42. Controller 18 then determines if any of the data blocks are bad as the data blocks are being read as shown in box 44. Parity accumulator 34 accumulates parity of the good data blocks as the data blocks are being read as shown in block 46. Controller 18 then sends the good data blocks prior to a bad data block to host computer 12 as shown in box 47.

Controller 18 then reads the parity block from magnetic tape 14 as shown in box 48. Controller 18 then reconstructs a bad data block from the accumulated parity of the good data blocks and the parity block as shown in box 50. Controller 18 then sends the reconstructed data block to host computer 12 as shown in box 52 and then sends the good data blocks after the reconstructed data block to host computer 12 as shown in box 54.

Figure 5:
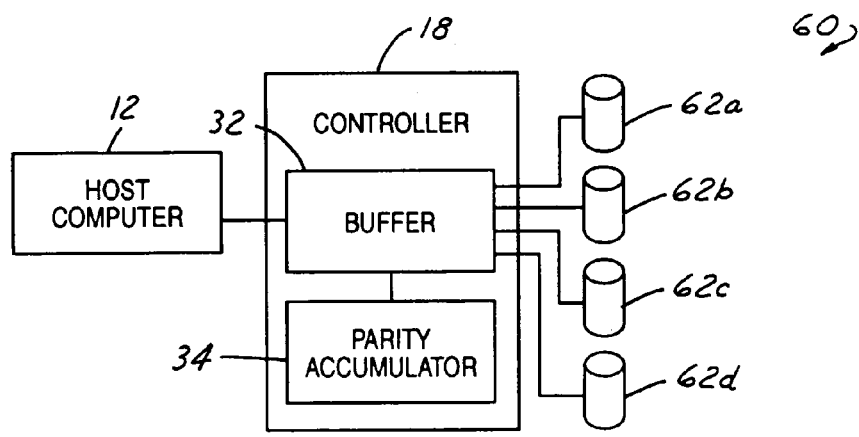
FIG. 5 illustrates a data storage array system in accordance with an alternate embodiment of the present invention.

Referring now to FIG. 5 with reference to FIGS. 1–3, an alternative embodiment of the data storage array system in accordance with the present invention is shown. Data storage array system 60 differs from data storage array system 30 shown in FIG. 3 in that separate and distinct storage elements 62a, 62b, 62c, and 62d have been substituted for magnetic tape 14. Storage elements 62 may be disk drives, tape drives, and the like. Storage elements 62 are connected in parallel to controller 18 for concurrent access with the controller. Controller 18 writes to and reads from storage elements in the same manner as described with reference to the track of magnetic tape 14 in FIG. 3.

Thus it is apparent that there has been provided, in accordance with the present invention, a data storage array method and system that fully satisfy the objects, aims, and advantages set forth above. While the present invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. In a magnetic tape having data blocks and a parity block in which the data blocks and the parity block are serially arranged on a track of the magnetic tape with the parity block following the data blocks and the parity block being based on the data blocks, a method for providing the data blocks from the track of the magnetic tape to a host, the method comprising:

reading the data blocks sequentially from the track of the magnetic tape;

determining if the data block currently being read is good or bad based on the reading of the data block currently being read;

providing the data block currently being read to the host if the currently being read data block does not follow a bad data block;

if one of the data blocks is bad, storing the good data blocks following the bad data block in sequential order;

accumulating parity of the good data blocks as the data blocks are being read;

reading the parity block from the track of the magnetic tape after all of the data blocks have been read;

if one of the data blocks is bad, reconstructing the bad data block from the accumulated parity of the data blocks and the parity block in order to form a reconstructed good data block;

providing the reconstructed good data block to the host; and providing the stored good data blocks to the host in sequential order after the reconstructed good data block has been provided to the host.

2. The method of claim 1 wherein:

accumulating parity of the good data blocks includes exclusive ORing the parity of the good data blocks read prior to the good data block currently being read with the good data block currently being read.

3. The method of claim 2 wherein:

reconstructing the bad data block includes exclusive ORing the parity of the good data blocks with the parity block.

4. A data storage array system for providing data blocks to a host, the system comprising:

magnetic tape having data blocks and a parity block in which the data blocks and the parity block are serially arranged on a track of the magnetic tape with the parity block following the data blocks and the parity block being based on the data blocks;

a controller for reading the data blocks sequentially from the track of the magnetic tape and for reading the parity block from the track of the magnetic tape, wherein the controller determines if the data block currently being read is good or bad based on the reading of the data block currently being read, the controller providing the data block currently being read to the host if the currently being read data block does not follow a bad data block, the controller reading the parity block from the track of the magnetic tape after all of the data blocks have been read;

a buffer, wherein if one of the data blocks is bad, the buffer stores the good data blocks following the bad data block in sequential order; and a parity accumulator for accumulating parity of the good data blocks as the controller reads the data blocks;

wherein if one of the data blocks is bad, the controller reconstructs the bad data block from the accumulated parity of the good data blocks and the parity block in order to form a reconstructed good data block;

wherein the controller provides the reconstructed good data block to the host and then provides the good data blocks stored in the buffer to the host in sequential order after the reconstructed good data block has been provided to the host.

5. The system of claim 4 wherein:

the parity accumulator accumulates parity of the good data blocks by exclusive ORing the parity of the good data blocks read prior to the good data block currently being read with the good data block currently being read.

6. The system of claim 5 wherein:

the controller reconstructs the bad data block by exclusive ORing the parity of the good data blocks with the parity block.

* * * * *